United States Patent
Venturino

(10) Patent No.: US 7,827,508 B2
(45) Date of Patent: Nov. 2, 2010

(54) HOTKEY FUNCTION IN DIGITAL CAMERA USER INTERFACE

(75) Inventor: Michael Venturino, Geneseo, NY (US)

(73) Assignee: Eastman Kodak Company, Rochester, NY (US)

( * ) Notice: Subject to any disclaimer, the term of this patent is extended or adjusted under 35 U.S.C. 154(b) by 2317 days.

(21) Appl. No.: 10/243,030

(22) Filed: Sep. 13, 2002

(65) Prior Publication Data

US 2004/0051741 A1 Mar. 18, 2004

(51) Int. Cl.
G06F 3/00 (2006.01)
G06F 9/00 (2006.01)
G06F 17/00 (2006.01)

(52) U.S. Cl. ............... 715/864; 715/788; 715/747; 715/810; 715/812

(58) Field of Classification Search .............. 715/864, 715/747, 810, 812, 788
See application file for complete search history.

(56) References Cited

U.S. PATENT DOCUMENTS

| | | | |
|---|---|---|---|
| 4,982,291 A | 1/1991 | Kurahashi et al. | |
| 5,164,831 A | 11/1992 | Kuchta et al. | |
| 5,565,935 A | 10/1996 | Miura et al. | |
| 5,610,654 A | 3/1997 | Parulski et al. | |
| 5,784,059 A * | 7/1998 | Morimoto et al. | 715/854 |
| 5,808,610 A * | 9/1998 | Benson et al. | 715/788 |
| 6,154,210 A | 11/2000 | Anderson | |
| 6,313,877 B1 | 11/2001 | Anderson | |
| 6,894,718 B2 * | 5/2005 | Sato | 348/207.2 |
| 6,952,229 B1 * | 10/2005 | Takahashi et al. | 348/333.02 |
| 2001/0043279 A1 * | 11/2001 | Niikawa et al. | 348/335 |
| 2002/0024604 A1 | 2/2002 | Ejima et al. | |
| 2002/0030754 A1 | 3/2002 | Sugimoto | |
| 2002/0057351 A1 | 5/2002 | Suzuki et al. | |
| 2002/0123368 A1 | 9/2002 | Yamadera et al. | |
| 2002/0145633 A1 * | 10/2002 | Ohmura | 345/838 |
| 2003/0206239 A1 * | 11/2003 | Battles | 348/333.02 |

FOREIGN PATENT DOCUMENTS

EP 1164770 12/2001
JP 2001-136418 5/2001

* cited by examiner

*Primary Examiner*—Kieu Vu
*Assistant Examiner*—Sabrina L. Greene
(74) *Attorney, Agent, or Firm*—Thomas J. Strouse; Peyton C. Watkins

(57) ABSTRACT

A digital camera comprising: a display; means for displaying on the display a menu of user selectable options; first user activated means for sequentially navigating through the displayed menu of user selectable options; and second user activated means for directly choosing a predetermined one of the options without having to navigate sequentially through the options.

10 Claims, 6 Drawing Sheets

HOTKEY FUNCTION IN DIGITAL CAMERA USER INTERFACE

FIELD OF THE INVENTION

This invention relates in general to a digital information/imaging system, such as a digital camera, and more particular to a digital information/imaging system having a dedicated switch for quickly accessing user-specified functions that are frequently changed.

BACKGROUND OF THE INVENTION

Handheld digital information/imaging systems, such as digital cameras, cell phones, personal digital assistants, etc. have become widespread in use in recent years. In order to present images and systems information to a system user, the system is usually provided with at least one display for displaying images and/or information useful to the user. User interface switches are also usually provided to navigate among items displayed on the display. In digital cameras, it is typical to have a large LCD (Liquid Crystal Display) display for displaying an image or images captured by the digital camera. The display can also display image capture related functions and menus of camera features that are user selectable (See: U.S. patent application Publication U.S. Ser. No. 2002/0030754 A1, published Mar. 14, 2002, inventor Sugimoto; U.S. patent application Publication U.S. Ser. No. 2002/0024604 A1, published Feb. 28, 2002, inventors Fjima et al.; U.S. patent application Publication U.S. Ser. No. 2002/0057351 A1, published May 16, 2002, inventors Suzuki et al.; U.S. Pat. No. 6,313,877 B1, issued Nov. 6, 2001, inventor Anderson).

It would be desirable to provide a user with means to access frequently changed functions without having to scroll through several screens before the function is accessed. None of the former or following patents disclose such a capability: U.S. Pat. No. 6,154,210, issued Nov. 28, 2000, inventor Anderson; U.S. Pat. No. 5,565,935, issued Oct. 15, 1996, inventors Miura et al.; U.S. Pat. No. 4,982,291, issued Jan. 1, 1991, inventors Kurahashi et al.; and U.S. patent application Publication U.S. Ser. No. 2002/0024608A1, published Feb. 28, 2002, inventors Ejina et al.

SUMMARY OF THE INVENTION

According to the present invention, there is provided a solution to the problems of the prior art.

According to a feature of the present invention, there is provided a digital camera comprising: a display; means for displaying on said display a menu of user selectable options; first user activated means for sequentially navigating through said displayed menu of user selectable options; and second user activated means for directly choosing a predetermined one of said options without having to navigate sequentially through said options.

ADVANTAGEOUS EFFECT OF THE INVENTION

The invention has the following advantages.

1. A digital information/imaging system is provided having a dedicated switch for quickly accessing user-specified functions that are frequently changed.

2. Multiple user-specified functions can be accessed with a dedicated switch used in combination with a navigation switch assembly.

DETAILED DESCRIPTION OF THE INVENTION

Although in the following description, the present invention will be described incorporated into a digital camera, it will be understood that the invention is also applicable to other hand held or portable digital information/imaging systems such as cell phones, personal digital assistants, portable computers and the like.

Figure 1:
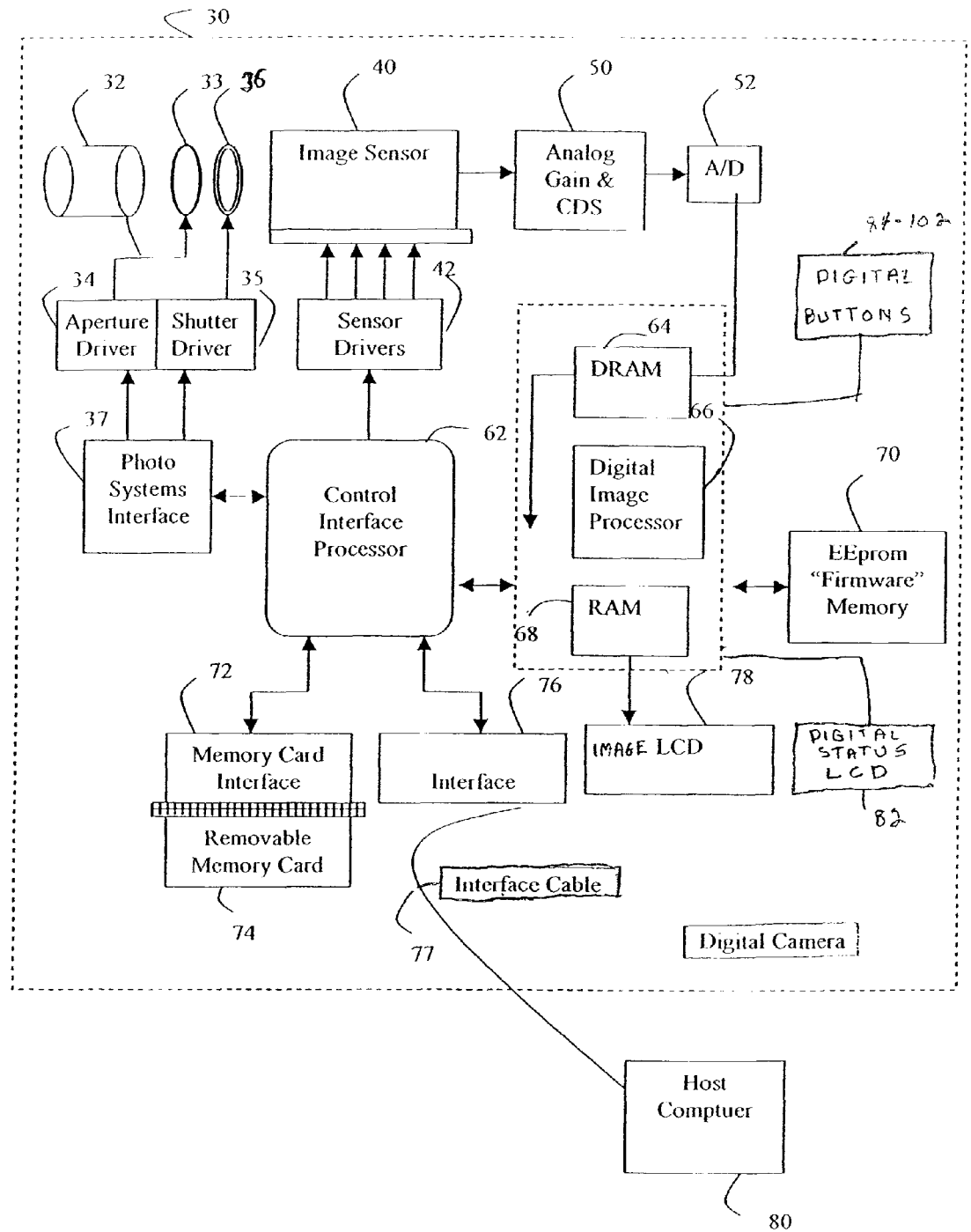
FIG. 1 is a block diagram of an exemplary digital camera incorporating the present invention.

FIG. 1 is a block diagram of an exemplary digital camera which implements the method and incorporates the apparatus of the present invention. The digital camera 30 produces digital images that are stored on the removable memory card 74. The digital camera 30 includes a lens 32, an electrically adjustable aperture 33 driven by aperture motor drive 34 and an electrically driven mechanical shutter 36 driven by shutter motor drive 35. The lens 32 focuses light from a scene (not shown) on an image sensor 40, for example, a single-chip color CCD image sensor, using the well known Bayer color filter pattern. The image sensor 40 is controlled by sensor driver 42. The aperture motor 34 and shutter motor 35 and the sensor driver 42 are controlled by control signals supplied by a control interface processor 62 and photo systems interface 37.

The control interface processor 62 receives inputs from the Photo Systems Interface 37. The analog output signal from the image sensor 40 is amplified and converted to digital data by the analog signal processing (ASP) 50 and analog-to-digital (A/D) converter circuit 52. The ASP 50 and A/D 52 include a programmable electrical gain that can be used to adjust the effective ISO speed setting of the camera. This can be done as described in commonly-assigned U.S. Pat. No. 5,610,654, issued Mar. 11, 1997, inventors Parulski et al. The digital data is stored in a DRAM buffer memory 64 and subsequently processed by a digital image processor 66 controlled by the firmware stored in the firmware memory 70, which can be flash EPROM memory. Alternatively, the digital image processor 66 can be provided by custom circuitry (e.g., by one or more custom integrated circuits [ICs] designed only for use in digital cameras), or by a combination of programmable processor(s) and custom circuits.

The processed digital image file is provided to a memory card interface 72 which stores the digital image file on the removable memory card 74. Removable memory cards 74 are known to those skilled in the art. For example, the removable memory card 74 can include memory cards adapted to the PCMCIA card interface standard, as described in the PC Card Standard, Release 2.0, published by the Personal Computer Memory Card International Association (PCMCIA), Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards, or other types of digital memory devices, such as magnetic hard drives, magnetic tape, or optical disks, could alternatively be used to store the digital images.

In some embodiments, the digital image processor 66 performs color interpolation followed by color and tone correction, in order to produce rendered sRGB image data. The rendered sRGB image data is then JPEG compressed and stored as a JPEG image file on the removable memory card 74. In other embodiments, the processor directly compressed data on the removable memory card 74, and the image is later "finished" by processing the compressed Bayer color image data using the host PC 80.

The processor 66 also creates a "thumbnail" size image that is stored in RAM memory 68 and supplied to the color image LCD 78, which displays the captured image for the user to review. A digital status dot matrix LCD 82 is also provided. The mutual display support between LCDs 78 and 82 is described in more detail later. Instead of a color LCD image display, the digital camera 30 could use an organic light emitting diode (OLED) display, or many other types of image displays. The thumbnail image can be created as described in commonly-assigned U.S. Pat. No. 5,164,831, issued Nov. 17, 1992, inventors Kuchta et al., the disclosure of which is herein incorporated by reference. The graphical user interface displayed on the color LCD image display 78 and on the digital status LCD 82 is controlled by the user interface portion of the firmware stored in the firmware memory 70 and by digital buttons 84-100. A third display (not shown) can be provided on the top of the camera 10 to show camera body settings such as aperture, shutter speed, exposure mode, etc.

After a series of images have been taken and stored on the removable memory card 74, the removable memory card 74 can be inserted into a card reader (not shown) in host PC 80. Alternatively, an interface cable 77 can be used to connect between the interface 76 in the digital camera 30 and the host PC 80. The interface cable 77 can conform to, for example, that well known IEEE 1394 interface specification, the universal serial bus (USB) interface specification, or other wired or wireless interface specifications.

Alternatively, the digital camera 30 could be comprised of a digital back for a 35 mm or medium format film camera. In this case, the lens 32, aperture 34, shutter 36 are provided as part of the film camera body, and the other components, including the image sensor 40, image processor 66 and color LCD image display 78, are provided as part of a separate digital camera back that is connected to the film camera body. The connection preferably includes an electrical connector (not shown), so that the lens 32, aperture 33, and shutter 36 can be controlled by the control processor and timing generator 60 in the digital back.

Figure 2:
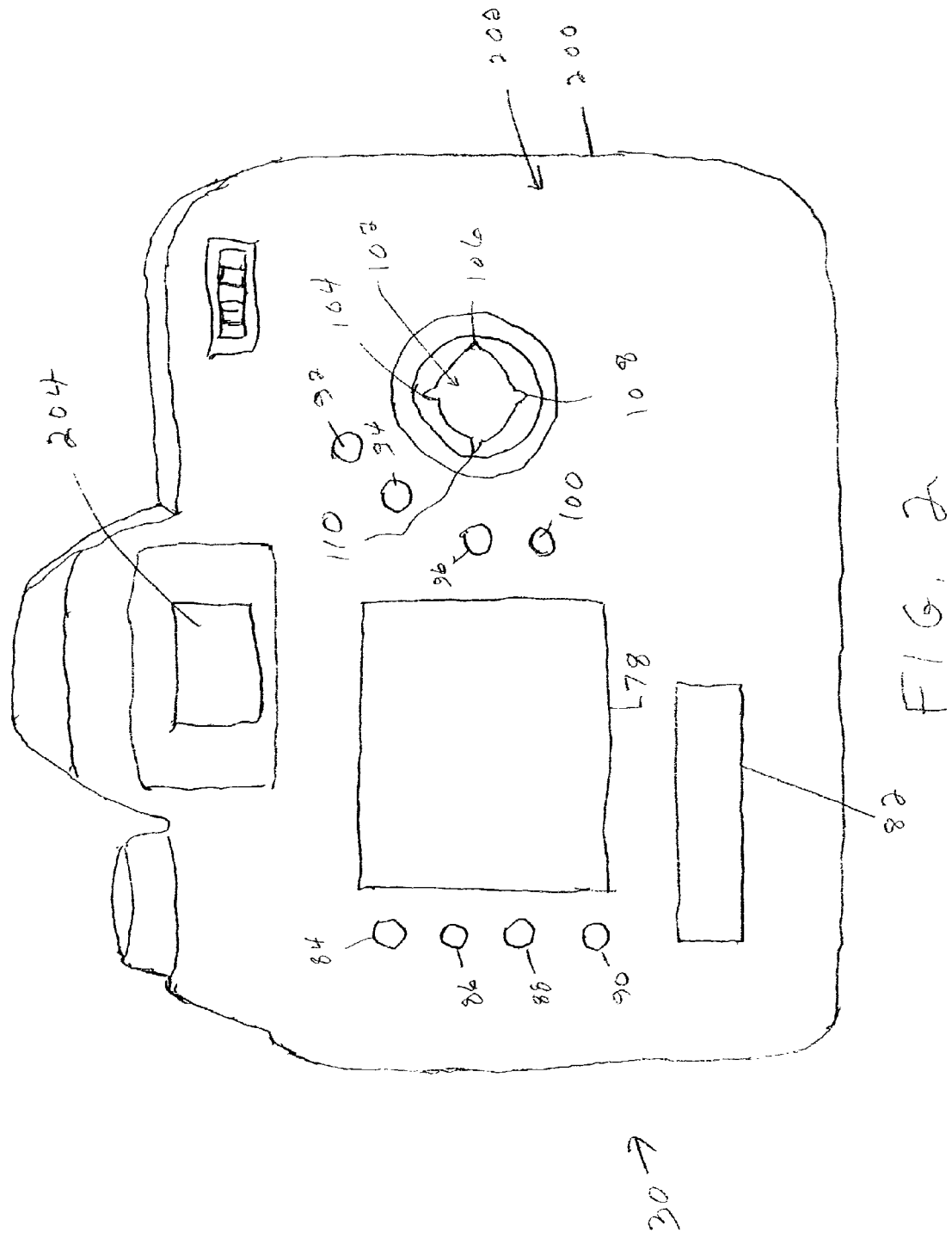
FIG. 2 is a diagrammatic view of the back panel of the camera of FIG. 1 showing first and second displays and a user interface according to the invention.

Referring now to FIG. 2 there is shown a diagrammatic view of a camera 30 showing the back panel of the camera with components of a digital user interface incorporating the present invention. As shown, digital camera 30 includes a housing 200 having a back panel 202 including image LCD 78, digital status LCD 82 and digital buttons 84-102. Back panel 202 also includes a viewfinder 204 and other camera controls (not described). Digital buttons 84-102 include menu button 84, navigate button 86, hotkey button 88, digital status button 90, OK button 92, cancel button 94, delete button 96, tag/record button 100 and 4-way switch 102 having top (12 o'clock) position 104, right side (3 o'clock) position 106, bottom (6 o'clock) position 108, and left side (9 o'clock) position 110.

Following is a more detailed description of the components of the digital user interface.

Image LCD-78

A color Image LCD 78 serves as the display for interfacing with the camera menu system containing features and functions (e.g., image review, setting/changing settings). The Image LCD 78 displays three classes of information
images and image-related information (e.g., histogram);
camera digital feature/function menus, related sub-menus, and menu options;
text-based messages and error messages.

Digital Status LCD-82

The Digital Status LCD 82 is a programmable dot matrix display. The Digital Status LCD 82 portrays three classes of information, including:
the current status and settings that pertain to various capture-critical digital functions (icons and alphanumeric characters);
the information properties of images being reviewed on the Image LCD;
text-based messages to support and help interpret information displayed on the Image LCD;
procedural instructions.

With respect to its role in image capture, the Status LCD 82 assumes an enhanced interaction capability that will allow efficient access to these capture-related digital functions (white balance, etc).

The following describes the behavior of the digital buttons 84-102:

4-Way Switch

The 4-way switch 102 is composed of a single 4-directional rocker switch located on the back panel 202 of the camera 30. When pressed at one of the 12, 3, 6, or 9 o'clock positions 104, 106, 108, 110, the switch will result in an appropriate signal to the digital camera 30 and its associated firmware 70. The 4-way switch 102 controls different aspects of the camera depending on the state of the Image LCD 78.

4-Way Switch: LCD On

When the Image LCD 78 is on, the 4-way switch 102 is captured by the digital firmware and is used to control the information displayed on the Image LCD 78. The 4-way switch 102 operates in the following manner:

When any Display Mode is active (except when the Region of Interest (ROI) box is enabled):
  pressing the right 106/left 110 side of the 4-way switch 102 results in forward/backward navigation of images;
  pressing the top 104/bottom 108 of the 4-way switch 102 sequences through the four Display Modes.

When the Zoom Mode is active and the ROI box is enabled:
  pressing the left 110/right 106 side of the 4-way switch 102 results in a left 110/right 106 movement of the ROI box;
  pressing the top 104/bottom 108 of the 4-way switch results in a upward/downward movement of the ROI box.

When any Tabbed Menu screen or text-based menus are displayed on the LCD 102:
  pressing the right 106/left 110 side of the 4-way switch 102 results in left/right navigation of menu options (e.g., Tabbed Menu screens);
  when a Tabbed screen option with a cascaded menu is highlighted, pressing the right 106 side of the 4-way switch 102 enables the cascaded menu with the current value highlighted;
  when an enabled cascaded menu or double-cascaded menu is displayed, pressing the left side 110 of the 4-way switch 102 disables the menu;
  pressing the top 104/bottom 108 of the 4-way switch 102 results in an upward/downward navigation through vertically-arranged menu options (e.g., Tabbed Menu screen options, cascaded menu options).

The 4-way switch 102 may be used in a discrete or continuous manner. That is, images or menu options may be navigated one at a time by pressing and releasing one side of the 4-way switch 102. Alternatively, images or menu options may be navigated continuously by pressing and holding (for longer than 500 milliseconds) one side of the 4-way switch 102.

4-Way Switch 102: Digital Status Button 90 Active

When the Digital Status button 90 is pressed and held, the 4-way switch 102 is captured, taking control from either of the other camera functions (i.e., autofocus, Image Display) currently using the 4-way switch 102. When under the control of the Digital Status button 90, the 4-way switch 102 is used to sequence among the functions displayed on the Digital Status Display 82.

When the Digital Status button 90 has control of the 4-way switch 102, the switch 102 operates in the following manner:
- manipulation of the right 106-left 110 sides of the 4-way switch 102 sequences among the functional groupings, with wraparound;
- manipulation of the top 104-bottom 108 sides of the 4-way switch 102 sequences among the functional groupings, with wraparound.

OK Button-92

The OK button 92 is a push button located on the right side of the camera's back panel 202, just to the left of the 4-way switch 102 and above the Cancel button 94. The OK button 92 serves a number of functions:
- when the image LCD 78 is off, pressing the OK button turns it on;
- when a menu option is highlighted on image LCD 78, pressing the OK button 92 will implement that option;
- in the Zoom Mode with the ROI box disabled, pressing the OK button 92 will enable the ROI box at the default or the last-used position;
- in the Zoom Mode with the ROI box enabled, pressing the OK button will implement the zoom;
- when any confirmation screen is presented on image LCD 78, pressing the OK button 92 will implement the process (i.e., Delete Image, Click Balance).

Cancel Button-94

The Cancel button 94 is a push button located on the upper right side of the camera's back panel 202, just to the left of the 4-way switch 102 and below the OK button 92. The Cancel button 94 will serve a number of functions:
- when the image LCD 78 is on and any Display Mode is active, pressing the Cancel button 94 will turn the image LCD 78 off;
- when the image LCD 78 is on and displaying a sub-menu, pressing the Cancel button 94 exits from that sub-menu to the parent menu in the UI hierarchy without implementing any changes;
- in the Zoom mode with the ROI box enabled, pressing the Cancel button 94 will disable the ROI box;
- when any confirmation screen is presented, pressing the Cancel button 94 does not implement the process (Delete Image, Click Balance);
- when the Menu Bar is displayed on the image LCD 78, the Cancel button 94 will dismiss it. (The Menu Bar can also be toggled off by pressing the Menu button).

Menu Button-84

The Menu button 84 is a push button located on the left side of the camera's back panel 202, just to the left of the Image LCD 78 and above the Navigate button 86. The Menu button 84 will serve the following functions:
- when the Image LCD 78 is on and any Display Mode is active, pressing the Menu button 84 will display the last-accessed Tabbed Menu screen with the last-accessed option highlighted;
- when the tabbed Menu screen and its associated text-based menu is displayed on Image LCD 78, pressing the Menu button 84 will dismiss the Menu screen and display the last-used image mode;
- when the Image LCD 78 is off, pressing the Menu button 84 will turn the Image LCD 78 on and display the last-accessed Tabbed Menu screen with the last-accessed option highlighted;
- when a submenu option requiring an OK 92/Cancel button 94 press, the Menu Button 84 will not dismiss the Menu screen;
- when any Tabbed Menu screen is displayed on Image LCD 78, pressing and holding the Menu button 84 and manipulating the right 106/left 110 side of the 4-way switch 102 navigates the tabbed screens.

Tabbed Menu

The Menu Tabs on display 78 portray the various icons for setting/selecting various digital functions as well as controlling the LCD's image contrast. Each icon is highlighted as it is selected, and its associated menu screen is displayed. Icons not selected are not highlighted. The Menu Tab items are grouped according to function, and include the following functional groups:

Capture Screen
ISO
White Balance
Folder
CF Card
SD Card
Raw Resolution
JPEG Resolution
Crop Aspect Ratio
Review
Folder
External Video
Overexposure Indicator
Display Contrast
Image Mode Menu
Image Parameters
JPEG Quality
Digital Exposure Correction
Look
Noise Reduction
Sharpening Level
Output Color Space
Image Numbering
Camera Tools
User Mode
Battery Save
Vertical Release
Folder/File Naming
Language
Job Tracker
Firmware
Reset to Defaults
Time/Date
Video Format
Intervalometer
Serial Port Tabbed Menu Behavior Tabbed Menu Screens are the fundamental organization architecture for presenting the digital features as well as for changing the values and settings associated with those features.

Figure 6:
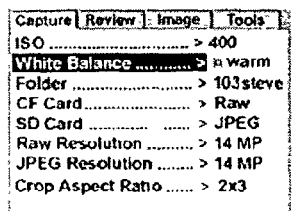
Figure 7:
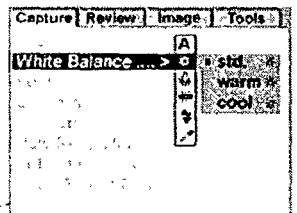
Figure 8:
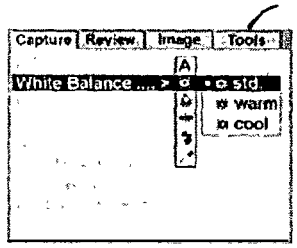

The Tabbed Menu structure consists of three levels, and it illustrated using the White Balance option on the Capture screen.

the 1st level consists of Tabbed Menu screens containing the various features and their current values (where appropriate). There are 5 Tabbed Menu Screens (FIG. 6).

the 2nd level consists of a cascaded menu options associated with the currently highlighted Tabbed Menu screen option. If a second cascaded menu of sub-options exists, it is displayed as a disabled (non-interactive) menu (FIG. 7).

the 3rd level consists of a subsidiary cascaded menu of options associated with the currently highlighted cascaded menu option. This subsidiary cascaded menu is navigable (FIG. 8).

The following description of control-display behavior applies to all tabbed menu screens.

Tabbed Menu Onset/Offset

The Tabbed Menu screen is displayed whenever the Menu button 84 is pressed or when the Digital Status display function is selected.

when the Tabbed Menu Screen is not displayed, pressing the Menu button 84 displays the Tabbed Menu screen, with the last-accessed option highlighted when the Tabbed Menu screen is displayed on display 78, pressing the Menu button 84 dismisses the Tabbed Menu screen and displays the last-used Image Mode when the Tabbed Menu screen is displayed on display 78, pressing the Cancel button dismisses the Tabbed Menu screen and displays the last-used Image Mode when the Tabbed Menu screen is displayed on display 78, pressing the Hyper-Nav button 86 dismisses the Tabbed Menu screen and displays the Single Image Mode with the Hyper-Nav overlay when a Digital Status display option is selected, the Tabbed Menu screen associated with the option is displayed on display 78

Tabbed Menu Screen Icons

The order of Menu tab icons (left-to-right) are: Capture, Image Settings and Camera Tools.

Tabbed Menu Navigation

Figure 9:
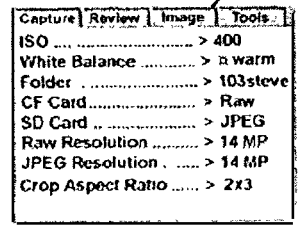

Navigating among the Tabbed Menu Screen icons is accomplished by pressing and holding the Menu button 84 and pressing the right or left side of the 4-way switch 102.

pressing the right side 106 of the 4-way switch 102 results in a left-to-right navigation among the Tabbed Menu screens. Wrap-around occurs such that when the rightmost screen is reached, pressing the right side of the 4-way switch again displays the Capture screen.

pressing the left side 110 of the 4-way switch 102 results in a right-to-left navigation among the Tabbed Menu screens. Wrap-around occurs such the when the leftmost screen (Capture screen) is reached, pressing the left side of the 4-way switch 102 again displays the rightmost screen (FIG. 9).

Figure 10:
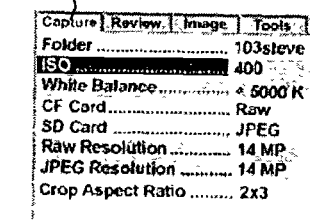
Figure 11:
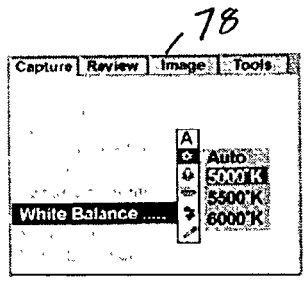

Options on each of the Tabbed Menu screens are arranged vertically and are navigated vertically by a top-bottom manipulation of the 4-way switch 102. A highlighting bar indicates that an option is selected. This highlighting bar extends the width of the option name and its associated ellipsis, but excludes the current value for that option.

pressing the button 108 of the 4-way switch 102 results in a downward movement of the highlighting through the options;

pressing the top 104 of the 4-way switch 102 results in an upward movement of the highlighting through the options;

there is a wrap-around capability in both the downward and upward highlighting directions.

when the last option in the vertically arranged option set is highlighted, further activation of the bottom of the 4-way switch wraps the highlighting to the top menu option when the first option in the vertically arranged option set is reached, further activation of the top of the 4-way switch wraps the highlighting to the bottom menu option manipulation of the left side of the 4-way switch 102 has no effect manipulation of the right side of the 4-way switch 102 displays a vertically-arranged submenu containing a list of possible values for the highlighted option the current value for that option within the submenu is highlighted the other Tabbed Menu options are displayed with a disabled appearance, which includes gray text for the non-highlighted options and removal of their associated ellipses and current values if a vertically-arranged menu option has its own cascaded menu of sub-options, that cascaded menu is displayed with a disabled appearance, but with the current value highlighted (FIG. 10 and FIG. 11).

Capture Screen

Figure 12:
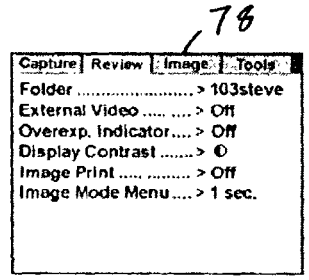
Figure 13:
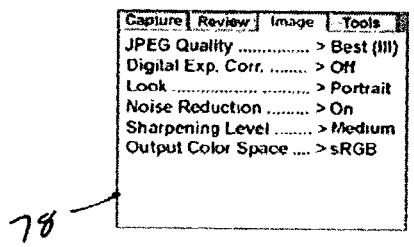

The Capture Screen has 8 options related to image capture:

ISO
White Balance
Folder
CF Card
SD Card
Raw Resolution
JPEG Resolution
Crop Aspect Ratio
Review Screen (FIG. 12)
Folder
External Video
Overexposure Indicator
Display Contrast
Image Mode Menu
Image Parameters Screen (FIG. 13)

Figure 14:
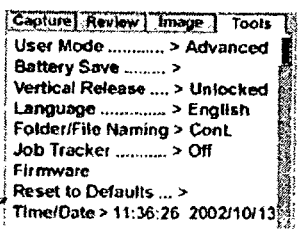

The Image Parameters screen allows the setting of various image parameters that are applied during the rendering and finishing of the different file types. This allows the image appearance of the different file types (e.g., DCR, JPEG) to be similar when viewed using the host software (e.g., Photo Desk, Capture Studio). The Image Parameters screen has 7 options that are applied during the rendering of raw and finished file parameters. For DCR files, the parameters are applied (except JPEG quality) when the images arc rendered and opened in Photo Desk or Capture Studio. For JPEG files, the parameters are applied as this file type is finished in-camera. The 7 options are:

JPEG Quality
Digital Exposure Correction
Look
Noise Reduction
Sharpening Level
Output Color Space
Camera Tools Screen (FIG. 14)

The Camera Tools screen is home to a number of settings that can be used to control and manage various aspects of the camera. This screen has 12 options for setting and changing camera settings:

User Mode
Battery Save
Vertical Release
Folder/File Naming

Language
Job Tracker
Firmware
Reset to Defaults
Time/Date
Video Format
Intervalometer
Serial Port
Hotkey Nav+ Button-86

The Nav+ button 86 allows a method of quickly and efficiently navigating among folders and images within a folder. The Nav+ button 86 is located on the left side of the Image LCD 78, below the Menu button 84. The Nav+ button 86 works in conjunction with the 4-way switch 102 to accomplish the following functions:

navigating among folders on a card;
navigating several images at a time within a folder.

When pressed, the Nav+ button 86 accomplishes the following:
if the Image LCD 78 is off, it turns the Image LCD 78 on and displays the currently active Image Mode with the Nav+overlay.

The Nav+ overlay includes the following information:
a list of folder names that exist on the memory card together with the number of images in each folder;
a location bar that indicates the position of the current image relative to the total number of images in the folder;
the location bar will have shading to indicate the number of images in the folder relative to the maximum number of images (maximum=99);
the location bar will have tick marks every nth image;
if the Image LCD 78 is on, it displays the currently active Image Mode with the Nav+overlay;
displays review-related information on the Digital Status display LCD 82.

Hotkey Button-88

The Hotkey button 88 is a push button located on the left side of the camera's back panel, to the left of the Image Display and below the navigate button 86. The Hotkey button 88 is used in conjunction with the 4-way switch 102 to allow quick access to user-specified functions. The Hotkey button 88 serves as a shortcut to a (user defined) frequently-changed function so that the function's current value may be changed. One or more functions can be set for use with the hotkey button.

When pressed, the Hotkey button 88 accomplishes the following:
if the Image LCD 78 is off, it turns the Image LCD 78 on and displays the function associated with the first Hotkey position;
if the Image LCD 78 is on, it displays the function associated with the first Hotkey position;
when used in conjunction with the 4-way switch 102 it displays the user-selected function;
pressing the Hotkey button and manipulating the right side of the 4-way switch 102 sequences through the Tabbed Menu screens associated with the assigned Hotkey positions in an ascending numerical order; the Digital Status Display portrays the information associated with the highlighted menu option;
pressing the Hotkey button 88 and manipulating the left side of the 4-way switch 102 sequences through the assigned Hotkey positions in a descending numerical order; the Digital Status Display portrays the information associated with the highlighted menu option;
as each Hotkey position is selected, its associated tabbed menu screen with highlighted function is displayed with a disabled appearance. When the Hotkey button 88 is released, the Tabbed Menu screen becomes enabled;
only functions associated with assigned Hotkey positions are displayed (i.e., unassigned positions are ignored for display purposes).

Setting Hotkey Functions

Figure 15:
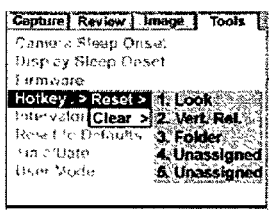
Figure 16:
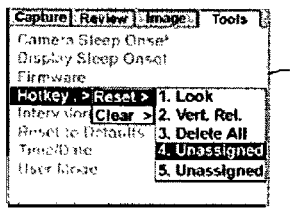

There are several settings. Hotkey positions can be assigned in the factory, while the other 3 are assigned. Hotkey assignments may be made via the Hotkey option in the Tools screen. Selecting the Hotkey option and pressing on the right side 106 of the 4-way switch 102 displays a cascaded menu containing the Hotkey options (FIGS. 15 and 16).

the Reset option allows new functions to be assigned to each of the Hotkey positions;
the Clear option allows removal of current functions without replacement.

Figure 17:
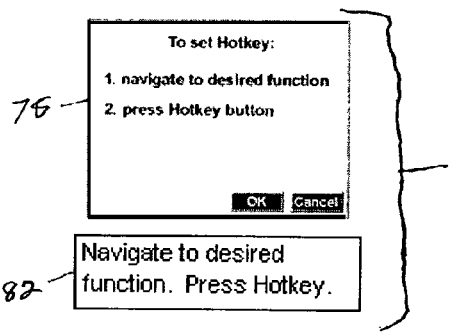

Selecting the Reset option "activates" the current function list and highlights any Unassigned positions. If there are no Unassigned positions, the last-changed value is highlighted. Pressing the OK button displays the following messages (Image LCD and Digital Status display) containing instructions for setting a Hotkey function (FIG. 17)

pressing the OK button 92 displays the tabbed screen with the currently assigned Hotkey function highlighted, or if the Hotkey position is unassigned, displays the Capture screen with its first option highlighted; the Digital Status display message persists until the Hotkey assignment procedure is completed.
pressing the Cancel button terminates the Hotkey assignment process and displays the Tools screen with the Hotkey option highlighted; the Digital Status display reverts to its previous state.

Figure 18:
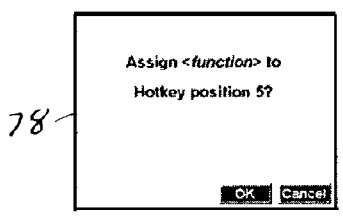
Figure 19:
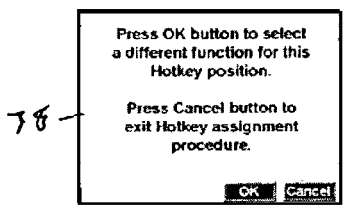

The user must navigate to the desired function; either the highlighted function or the function with its associates cascade menu may suffice for the purpose of Hotkey assignment. Once the desired function is displayed and highlighted, pressing the Hotkey button 88 displays the following message (FIG. 18).

pressing the OK button 92 assigns the highlighted function to the current Hotkey position and displays the Hotkey menu with the new function highlighted as feedback.
pressing the Cancel button 94 displays the following message screen (FIG. 19).
when the above screen is displayed pressing the OK button 92 returns the user to the previously displayed tabbed screen with the selected function highlighted
pressing the Cancel button 94 exits the Hotkey assignment procedure and returns the user to the Tools tab with Hotkey option highlighted Digital Status Button-90

The Digital Status button 90 is a push button located above the top left corner of the Digital Status display 82. This button functions to control access to capture-related functions portrayed on the Digital Status display 82.

pressing and holding the Digital Status button 90 highlights the last-used Digital Status display 82 function, traps the 4-way switch 102, and displays the tabbed Menu screen for the highlighted function (disabled appearance) on the Image Display 78;
if review-related information is displayed, pressing the Digital Status button 90 displays capture-related information and highlights the icon associated with the last-accessed function highlighted;

when the Digital Status button 90 is released, the Menu function is enabled.

Digital Status LCD-82

The Digital Status LCD 82 is a programmable display that portrays three different classes of information: (1) the current status and settings that pertain to various capture-critical digital functions, (2) the information properties of images being reviewed on the Image LCD 78, and (3) text-based messages to support and help interpret information displayed on the Image LCD 78. With respect to its role in image capture, the Digital Status LCD 82 assumes an enhanced interaction capability that will allow efficient access to these capture-related digital functions (white balance, etc.). With respect to its roles in menu screen navigation, the Digital Status LCD 82 assumes an interpretive support role (e.g., "help messages", and "tool tip messages") for the content on the Image Display 78.

Capture-Related Information: Interactive Display-Control Elements

The capture functionality of the Digital Status display 82 will be interactive in nature and will serve two functions:

displays a set of icons associated with capture-critical functions; these icons portray the current value of each function.

serves as a shortcut to a relevant menu option for changing the displayed value of the highlighted function.

The nature of the interaction is such that when a display element is highlighted by the user, the highlighted function on the Digital Status Display calls and portrays its associated Tabbed Menu screen function on the Image Display 78. The user may then interact directly with the Menu options associated with that function.

Figure 3:
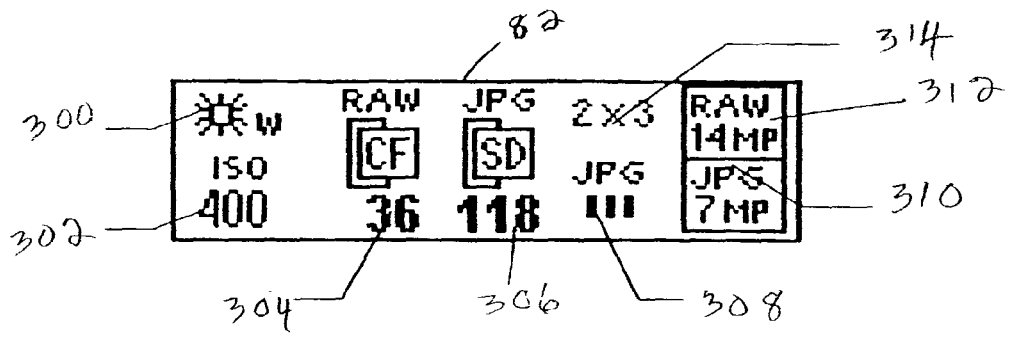
FIGS. 3-19 are diagrammatic views useful in explaining the present invention.

As shown in FIG. 3, Digital Status Display 82 displays icons for the following functions: white balance 300;

ISO speed 302;

CF and MM/SD memory cards 304, 306;

JPEG quality 308;

raw and JPEG resolution 310, 312; and crop aspect ratio 314.

Figure 4:
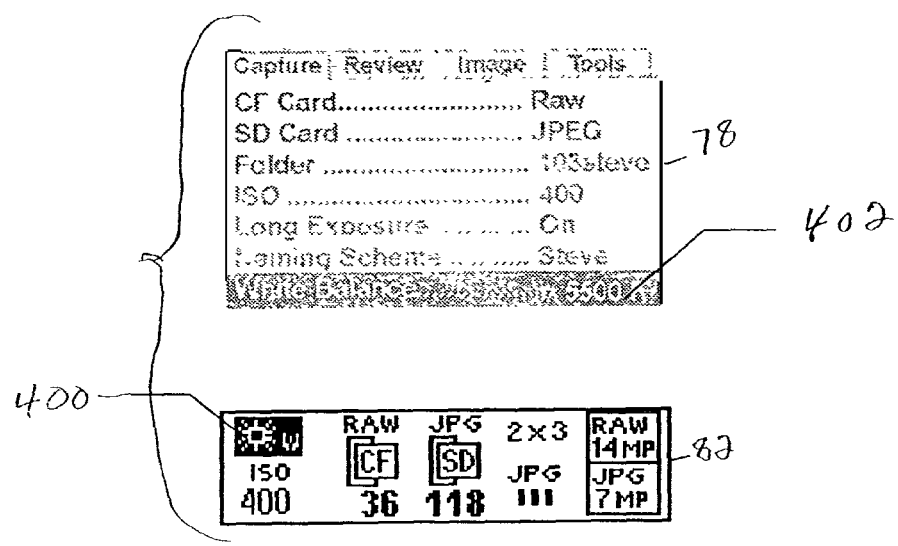

The highlighted Digital Status Display function 400 on display 82 has a corresponding menu option 402 displayed on Image Display 78 (FIG. 4).

Review Display Elements (Read Only)

The review functionality of the Digital Status Display will be non-interactive in nature and will serve a single purpose: it displays a set of image-based information that existed at the time of capture for the image.

Figure 5:
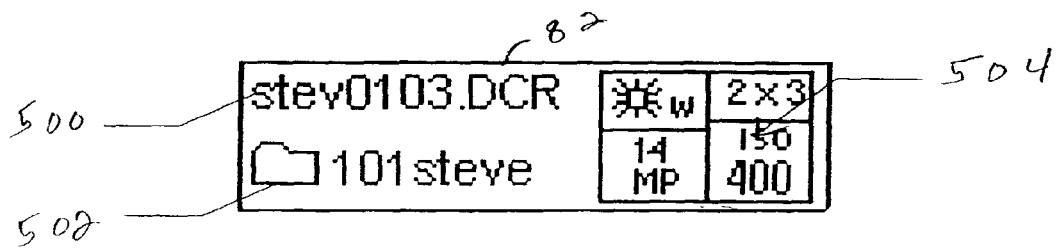

When the review-related information is displayed, the Digital Status Display reverts to the capture-related information when the shutter button is pressed to S1. In FIG. 5, current image number 500 and current folder name 502 are displayed on the left and white balance, crop aspect ratio, ISO and resolution 504 are displayed on the right of Digital Status Display 82.

Context-Sensitive Text Messages (Read Only)

The Digital Status Display 82 also provides a supporting role to the Image LCD 78. The nature of this support will be a combination of a "mini-help" and a "tool tips" function. The design intent behind this mutual display support is to provide an on-camera help system to aid the less experienced digital user.

The invention has been described in detail with particular reference to certain preferred embodiments thereof, but it will be understood that variations and modifications can be effected within the spirit and scope of the invention.

PARTS LIST

30 digital camera
32 lens
33 adjustable aperture
34 aperture driver
35 shutter motor drive
36 mechanical shutter
37 driver
40 image sensor
42 driver
50 analog Gain & CDS
52 A/D converter circuit
62 controlled interface processor
64 DRAM buffer memory
66 digital image processor
68 RAM
70 firmware memory
72 memory card interface
74 removable memory card
76 interface
77 interface cable
78 LCD
80 PC host computer
82 digital status LCD
84 menu button
86 navigate button
88 hotkey button
90 digital status button
92 OK button
94 cancel button
96 delete button
100 tag/record button
102 4-way switch
104 top position of switch
106 right position of switch
108 bottom position of switch
110 left position of switch
200 housing
202 back panel
300 white balance
302 ISO speed
304 CF memory card
306 SD memory card
308 JPEG quality
310 raw resolution
312 JPEG resolution
314 crop aspect ratio
400 digital status display function
402 menu option
500 image
502 folder name
504 ISO and resolution

What is claimed is:

1. A digital camera comprising:

a display;

means for displaying on said display a menu of user selectable options, said user selectable options comprising at least an initial option in an initial position in said menu and a plurality of non-initial options in respective non-initial positions in said menu;

first user activated means for sequentially navigating through said displayed menu of user selectable options;

second user activated means for directly choosing one of said non-initial options without having to navigate sequentially through any of said initial and non-initial options, wherein the one of said non-initial options directly chosen by activation of the second user activated means is one of a plurality of user-defined menu shortcuts stored in the digital camera and selectable by activation of the second user activated means; and third user activated means for controlling storage of respective ones of the user-defined menu shortcuts in the digital camera, wherein activation of the third user activated means in conjunction with navigation to a particular one of said non-initial options using the first user activated means results in storage of a corresponding user-defined menu shortcut that is subsequently selectable by activation of the second user activated means.

2. The camera of claim 1 wherein said means for displaying displays said menu of user selectable options in a linear array, and wherein said first user activated means is repeatedly actuated to navigate through said linear array of options.

3. The camera of claim 1 wherein said means for displaying displays said menu of user selectable options in a vertical array and wherein said first user activated means has up and down switches which when actuated sequentially navigate through said vertical array of options in up and down directions, respectively.

4. The camera of claim 1 wherein said second user activated means includes means for identifying a plurality of predetermined functions and a user actuated switch which can be actuated respectively to directly choose said predetermined functions.

5. The camera of claim 1 wherein said second user activated means comprises a user actuated menu shortcut means.

6. The camera of claim 5 wherein actuation of said user actuated menu shortcut means results in presentation on said display of at least one of a plurality of menu shortcuts corresponding to respective user selectable options in different ones of a plurality of menus.

7. The camera of claim 6 wherein said first user activated means is utilized to navigate through said plurality of menu shortcuts upon actuation of said user actuated menu shortcut means.

8. The camera of claim 6 wherein selection of a particular one of the menu shortcuts results in automatic access to the corresponding user selectable option without requiring user navigation through the menus.

9. The camera of claim 6 wherein the user actuated menu shortcut means comprises a menu shortcut button.

10. The camera of claim 9 wherein selection of a particular one of the menu shortcuts is achieved by depressing the menu shortcut button, navigating through the plurality menu shortcuts using the first user activated means until the particular one of the menu shortcuts is presented on said display, and then releasing the menu shortcut button.

* * * * *